Figure 8:
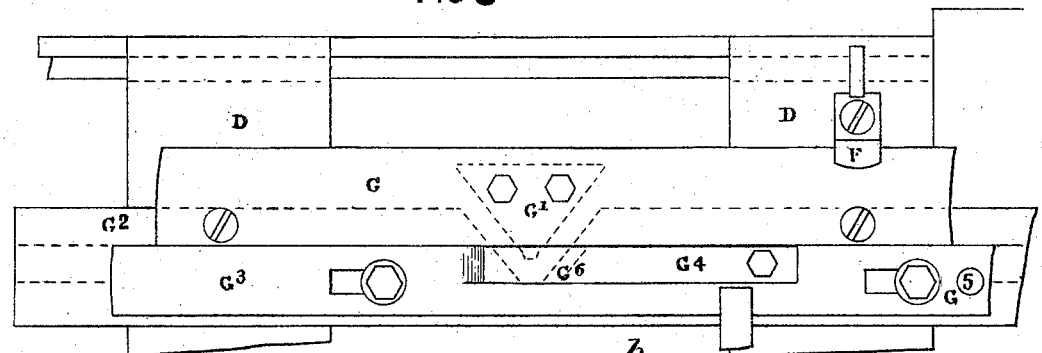

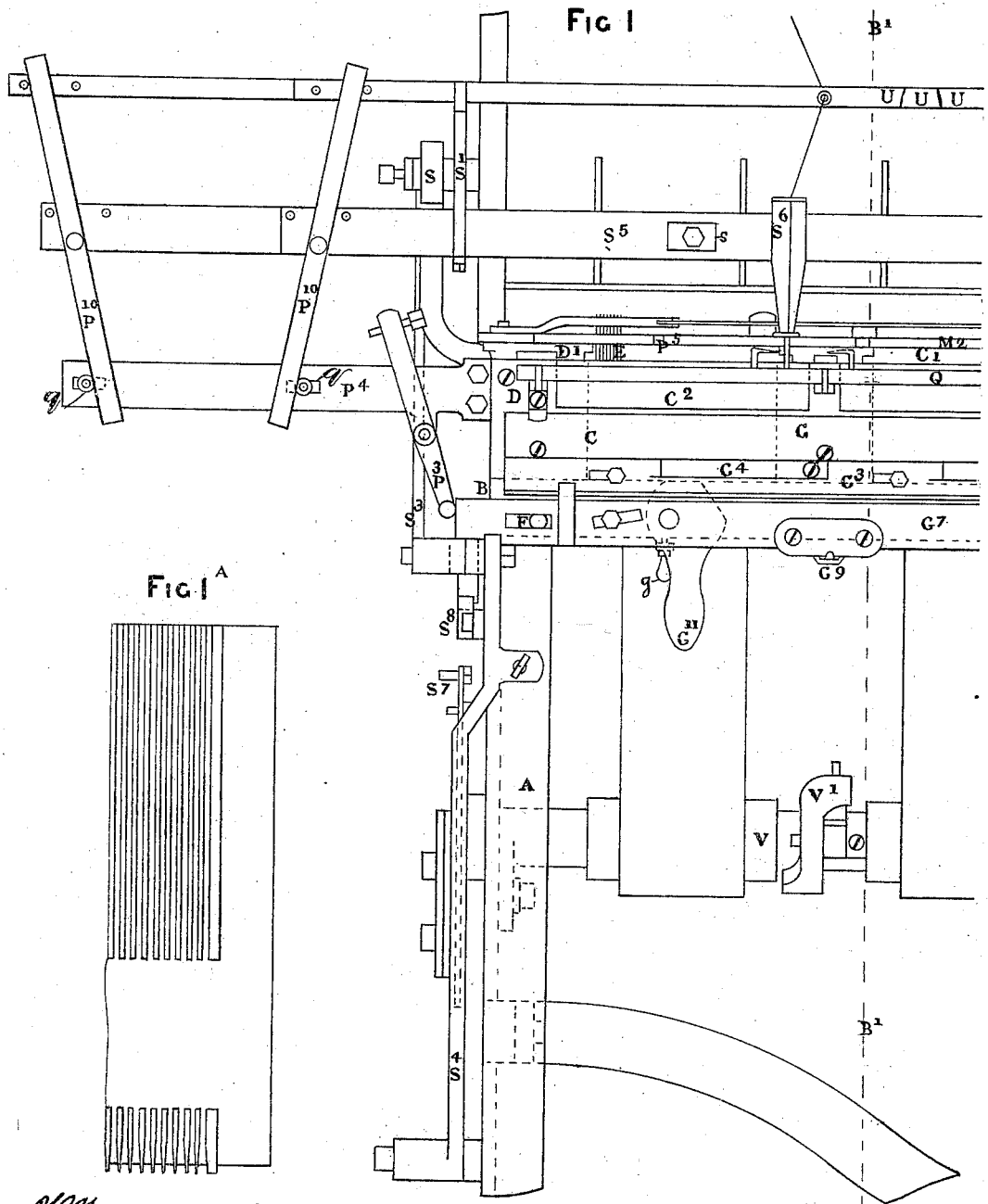

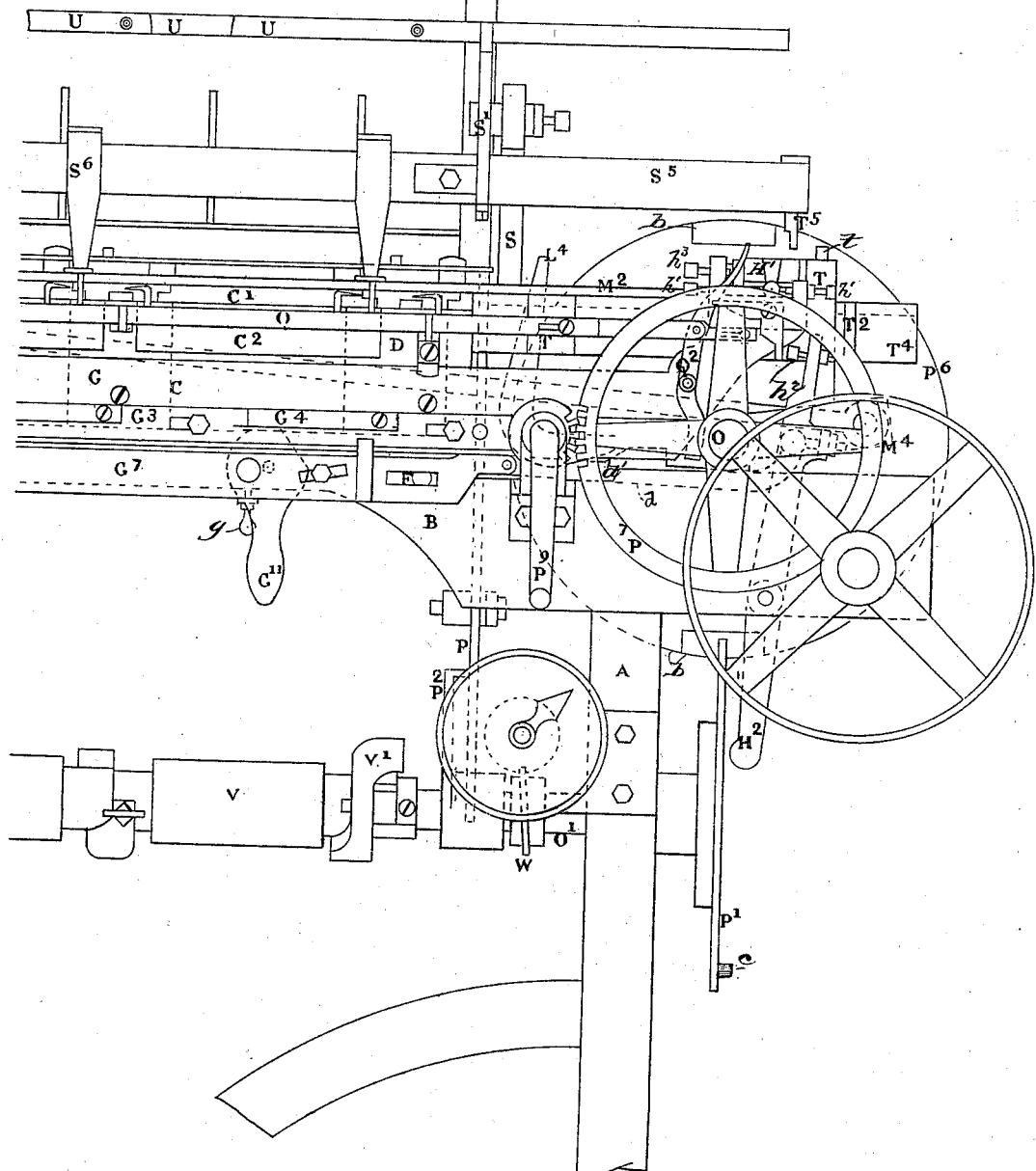

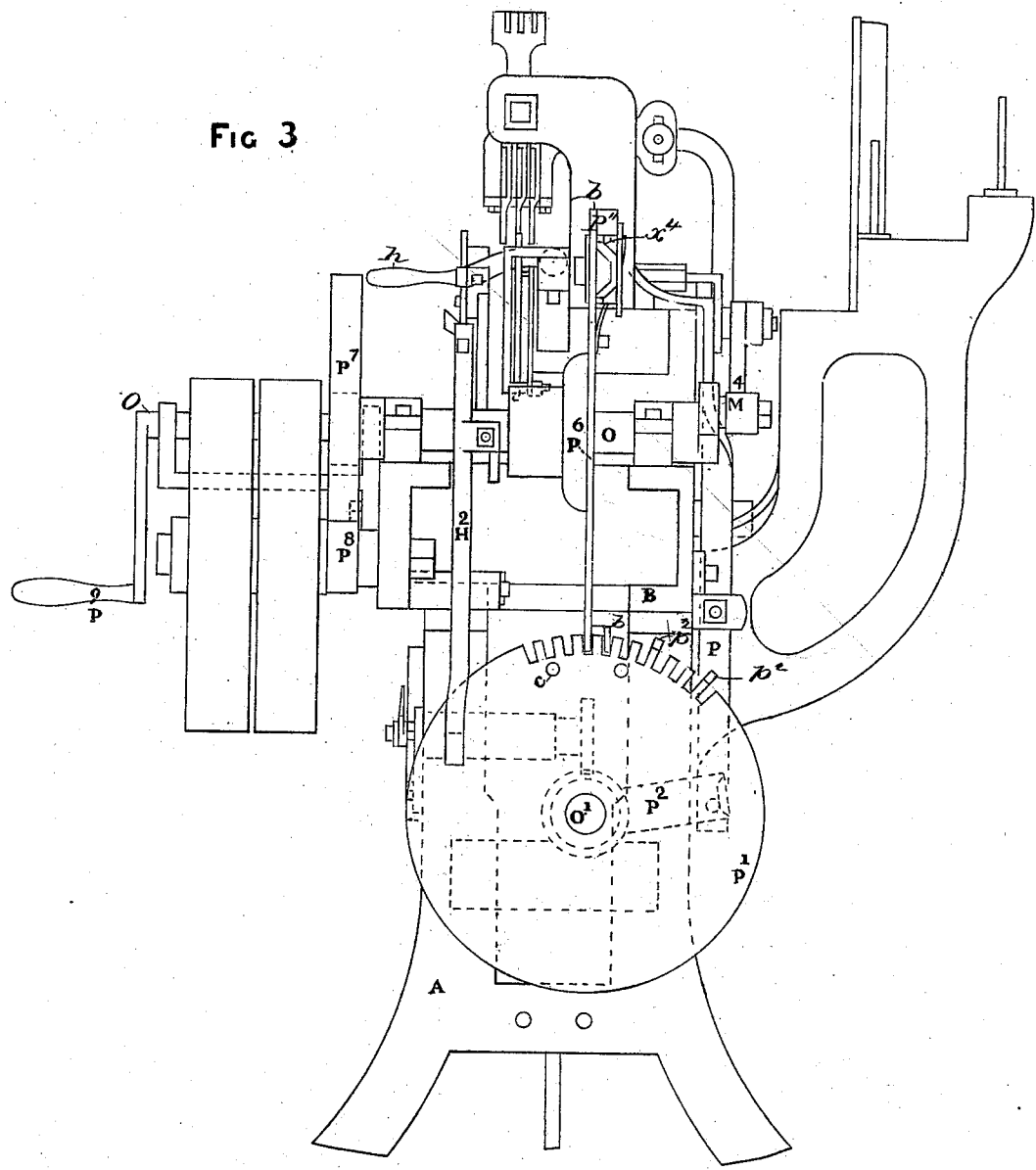

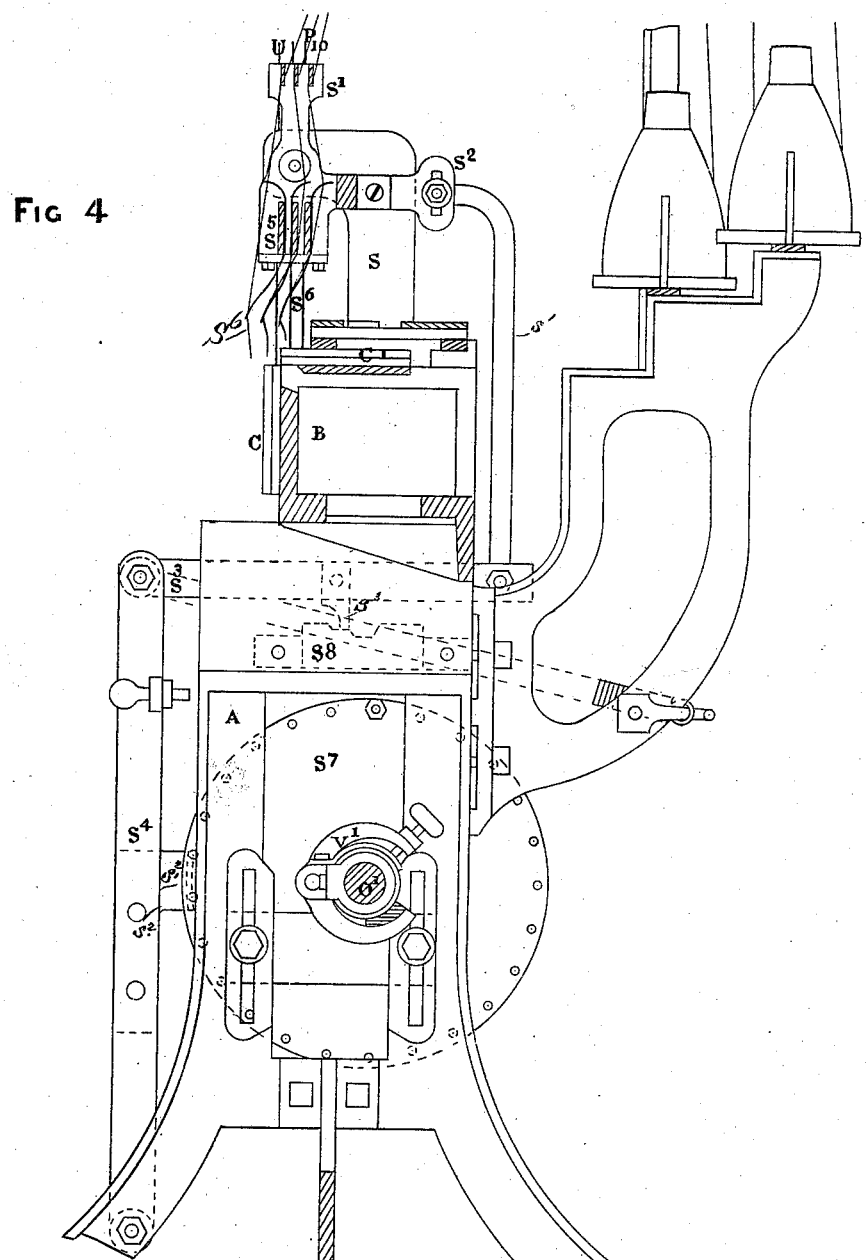

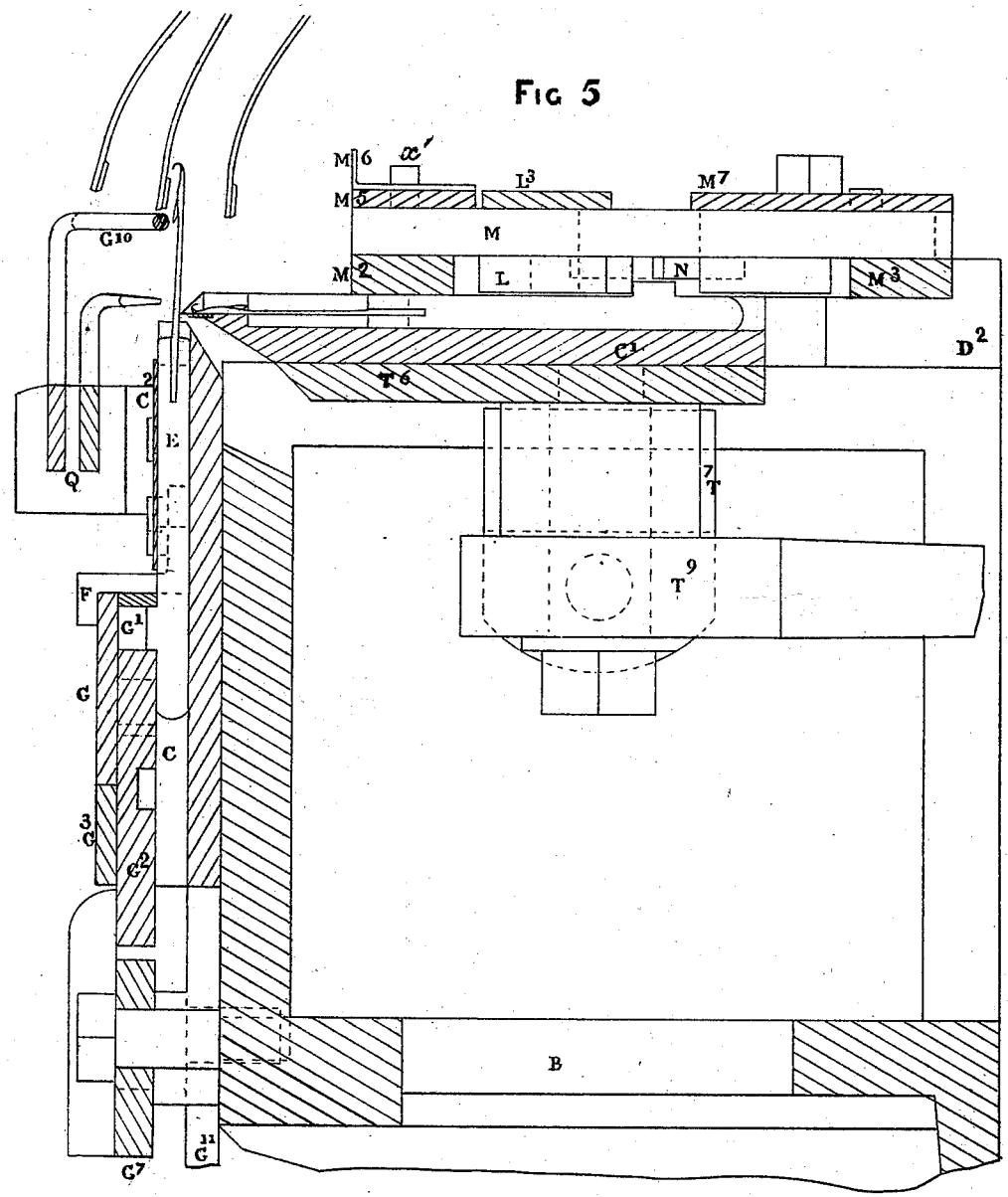

8 Sheets--Sheet 6.
T. COLTMAN.
Knitting-Machines.
No. 147,372.  Patented Feb. 10, 1874.
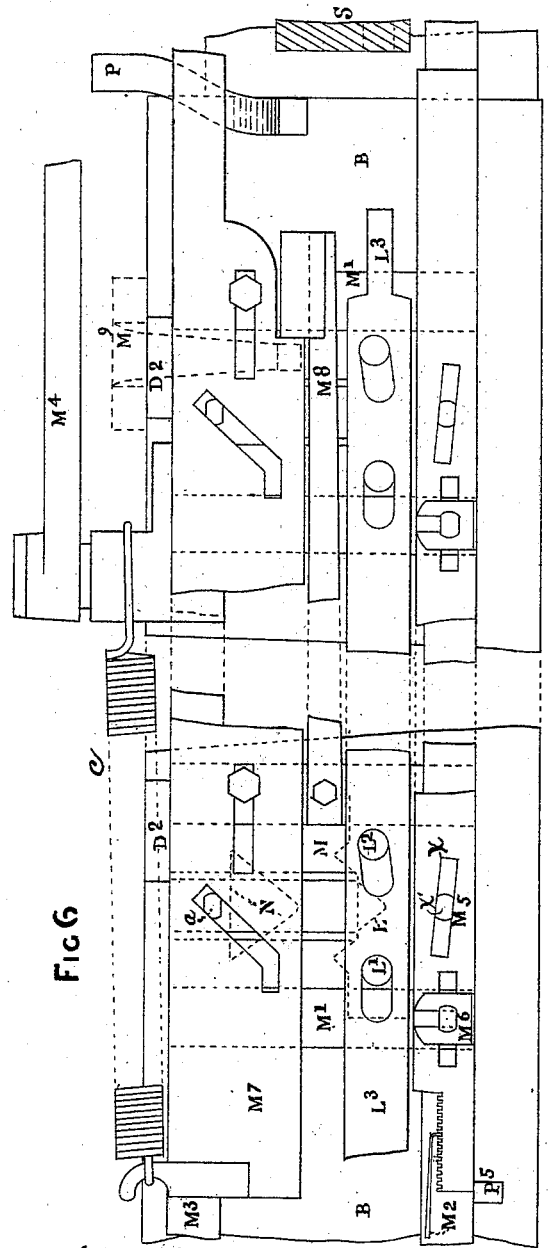
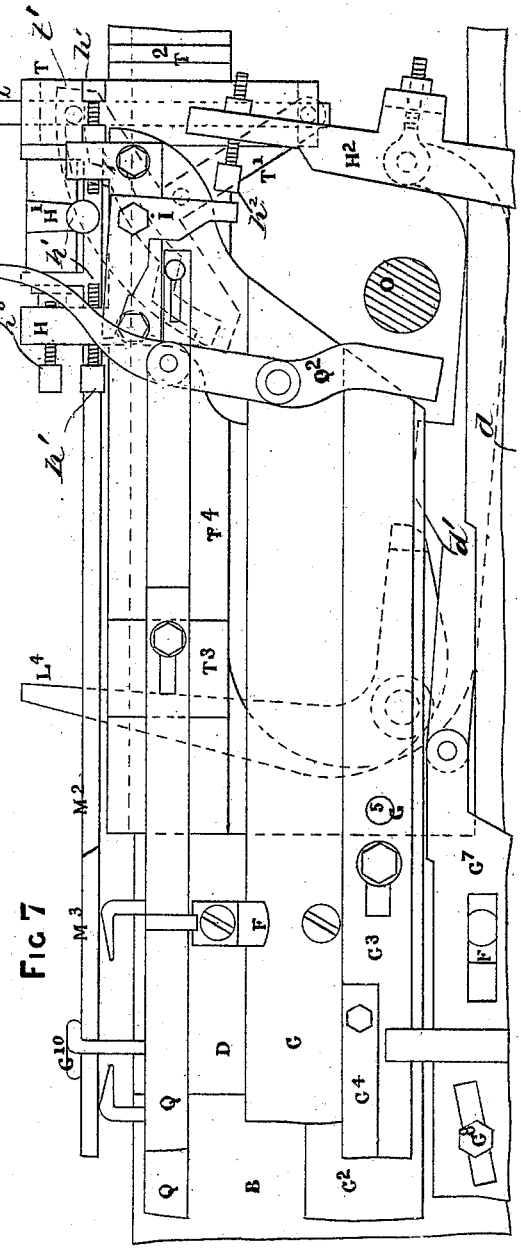

8 Sheets--Sheet 7.

T. COLTMAN.
Knitting-Machines.

No. 147,372. Patented Feb. 10, 1874.

Henry William Gough
Josiah Gimson

Thomas Coltman

AM. PHOTO-LITHOGRAPHIC CO. N.Y. (OSBORNE'S PROCESS)

8 Sheets--Sheet 8.

T. COLTMAN.
Knitting-Machines.

No. 147,372. Patented Feb. 10, 1874.

Witnesses:
H. C. Clark.
H. E. Matthews.

Inventor.
Thomas Coltman
by Dyer, Beadle & Co.
Attys.

UNITED STATES PATENT OFFICE.

THOMAS COLTMAN, OF LEICESTER, ENGLAND.

IMPROVEMENT IN KNITTING-MACHINES.

Specification forming part of Letters Patent No. 147,372, dated February 10, 1874; application filed May 31, 1872.

*To all whom it may concern:*

Be it known that I, THOMAS COLTMAN, of Leicester, England, machinist, have invented certain improvements in machinery employed in the manufacture of ribbed knitted fabrics, of which the following is a specification:

This invention is specially designed for knitting ribbed tops for half hose or socks, &c.; and consists mainly in certain combinations and arrangements of parts, whereby the machine is adapted to knit, automatically, the welt on the sock top, the main portion of solid ribbed work, and either a slack course to adapt it to be placed readily upon the machine for knitting the remainder of the sock, or a pocket consisting of two independent strips of plain flat fabric to adapt it to be united to woven work.

The details of construction and manner of operation will be fully described hereinafter.

In the drawings, Figure 1 represents a front plan view of the left end of the machine; Fig. 1ª, a plan view of a portion of one of the sleys or needle-holding plate; Fig. 2, a front view of the right end; Fig. 3, an end elevation of the right end; Fig. 4, a sectional elevation upon the line B' B', Fig. 1, showing the standard and pattern-wheel at the left end of the machine; Fig. 5, a sectional elevation, showing the needle-operating mechanism; Fig. 6, a plan view of the mechanism for adjusting the horizontal or machine needles; Fig. 7, a similar view of the mechanism for adjusting the vertical or frame needles. Figs. 8, 9, 10, 11, and 12 represent detached views of various parts, which will be fully described hereinafter.

To enable others skilled in the art to make and use my invention, I will now proceed to describe fully its construction and manner of operation.

For convenience of description, the machine will be described in separate divisions as far as possible.

It consists generally of proper frame-work supporting any suitable number of machines operated by one main power, but each adapted to knit independently a sock-top breadth. Each machine has a set of vertical needles termed "frame-needles," and a set of horizontal needles called "machine-needles," and these each have certain mechanism for automatically adjusting them, so that they are capable of working together or independently of each other, or to knit slack or close work. Each machine is also provided with a pattern-wheel, so that the top may be knit of varying colors in any desired pattern.

The mechanism for actuating the frame, which carries the mechanism for operating the machine-needles, will now be described. O, Figs. 2 and 3, represent the main shaft, to which power is applied in any proper manner. A crank attached to one end of the shaft is connected by means of the rod $M^4$, Figs 2, 3, and 6, with the longitudinally-moving frame, which carries the mechanism for operating the machine-needles.

The special mechanism for operating the horizontal needles will now be described. The longitudinally-moving frame carries a V-shaped cam-groove, in which play the bits of the needles in the usual well-known manner. The parts forming the cam-groove are adapted to slide laterally in the frame, so that the following adjustments are made when desired: First, the block L, Fig. 6, which forms the front of the cam-groove, may be moved slightly forward or backward to cause the needles to so move as to make a loop of the desired length for the main portion of the work. Second, the same block may be moved back upon one side, or rather end, for the purpose of causing the needles, in their movement in one direction to draw a larger loop, for the purpose of making a slack course. Third, the block N forming the rear portion of the cam-groove may be moved so far back as to permit the frame to move across the machine without affecting the needles, in which case they are inoperative.

The mechanism for making these adjustments will now be described. That for making the first adjustment is as follows: $M^5$ represents a plate adapted to move longitudinally upon the needle-operating frame, and held in place by studs $M^6$, and is provided with an inclined slot, $x$, adapted to hold the stud $x'$ projecting vertically from the block L forming the front side of the cam-groove. By moving the plate longitudinally, the block L is caused to slide laterally in the frame, so that the needles are made to move in line nearer to or more remote from the front edge of the needle plate or sley, as the case may be. The plate after having been properly adjusted in any desired position is fixed in that position by any suitable means, those shown in the drawing consisting of a series of notches and a spring-catch, $M^2$, which engages with any one of the series, as shown.

The mechanism for making the second adjustment which causes the machine-needles to draw in a larger loop when moving in one direction, will now be described.

$L^3$ represents a plate, also adapted to move longitudinally with the needle-operating frame, which is held in place by stud $L^1$, and is provided also, at one end, with an incline slot, through which projects a stud, $L^2$, also attached to one end of the front cam-plate L.

By the longitudinal movement of this plate, which movement is accomplished by automatic mechanism hereinafter described, one end of the cam-plate is drawn back, and consequently the needles, in their movement in one direction, are caused to draw a longer loop.

The mechanism for making the third adjustment, which makes the needles inoperative, will now be described.

$M^7$ also represents a plate adapted for longitudinal movement, and having an inclined slot, through which projects a stud, $a$, attached to the rear cam-block.

By the proper movement of this plate through automatic mechanism hereinafter described, the rear cam-block is drawn backward, so that the needles do not come in contact with the cam as the frame moves across the machine, and consequently they are inoperative.

Figure 9:
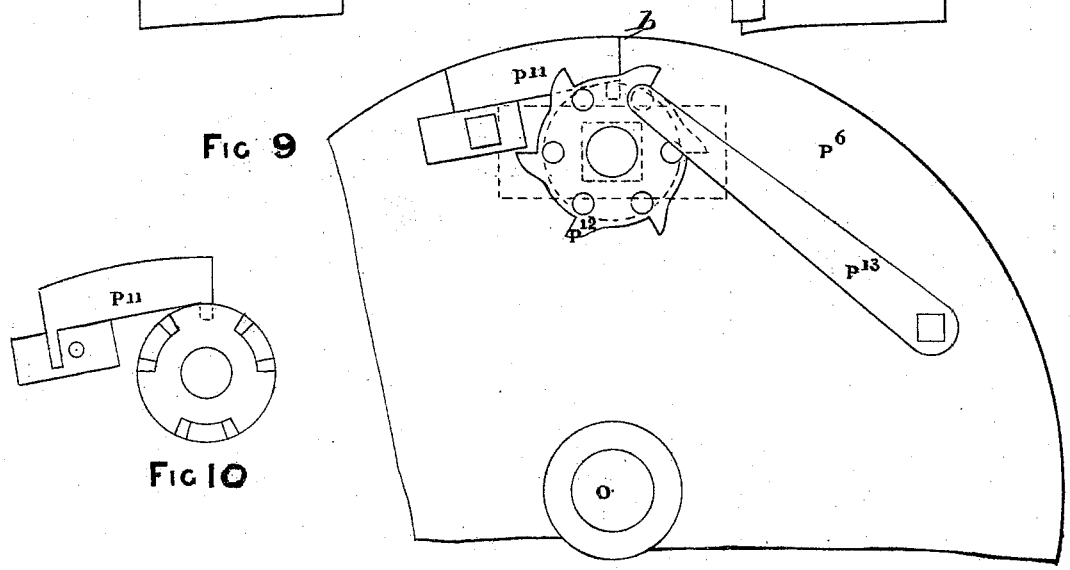
Figure 10:
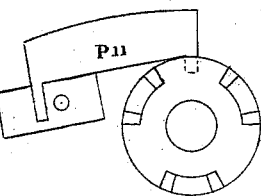
Figure 11:
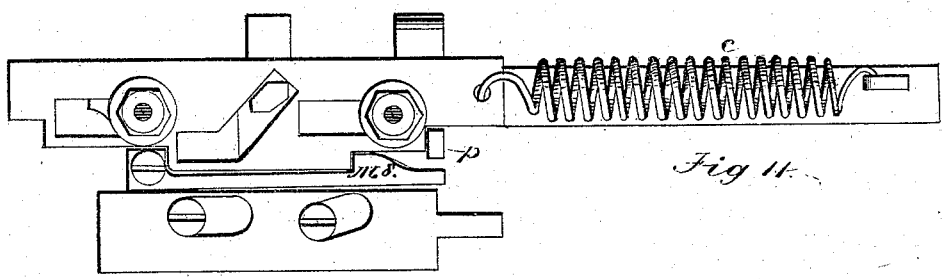

The plate $L^3$, for moving one end of the front cam-block when it is desired to make a slack course, is automatically operated by the following mechanism:

$P^6$, Figs. 2, 3, and 9, represents a disk upon the main shaft O, which is formed at the points $b\ b$ of its periphery, in such manner as to give motion to the toothed wheel $P^1$ in a similar manner to a worm-gear, the latter being moved one tooth at each half-revolution of the disk. $c$, Figs. 2 and 3, represents a pin upon the face of the toothed wheel, which is adapted to engage with, and give motion to, the short arm of the lever $H^2$, Figs. 2 and 3, to which is connected the bar $d$, Figs. 2 and 7, attached to the longitudinally-sliding plate $G^7$.

The bar $d$ is provided with a notch, $d^1$, Fig. 7, having an inclined side, as shown, in which rests the short arm of the bent lever $L^4$, the long arm of which is adapted, when in proper position, to come in contact, when the frame moves forward, with the projecting end of the adjusting-plate $L^3$, Fig. 6, and hold it, so that it is compelled to slide upon the frame, and adjust the cam-block L by means of the inclined slot and stud $L^2$, the operation being substantially as follows: At each revolution of the main shaft O, the toothed wheel $P^1$, through the disk $P^6$, is moved forward the distance of two teeth, and when the wheel $P^1$ has made one complete revolution, the pin $c$ upon its face comes into contact with the short arm of lever $H^2$, and through the bar $d$ actuates the bent lever $L^4$ in such manner that its end is struck by the projecting end of the plate $L^3$ in the movement of the needle-operating frame, by which means the plate is moved longitudinally, and the cam-plate shifted at one end, so that at the next movement of the cam L in the opposite direction, the needles are caused to move further from the edge of the sley, and consequently draw in a longer loop for the slack course.

The mechanism for automatically actuating the plate which is adapted to cause the needles to be inoperative will now be described.

$O^1$, Figs. 2 and 3, represents a shaft properly supported in the frame-work, which receives a revolving movement from the toothed wheel $P^1$. $P^2$ represents a projecting arm upon the shaft, which is adapted to engage with a pin upon the short arm of lever P, and draw in the latter, by which means a projection, $p$, Figs. 4, 11, and 12, upon the bent end of its long arm, is brought into such position that the plate, by its forward movement, is brought into contact with it and held against the pressure of the spring $c$, Fig. 11, while the main frame moves on until the spring-catch $M^8$, Figs. 6 and 12, falls into place and holds it in position.

Figure 12:
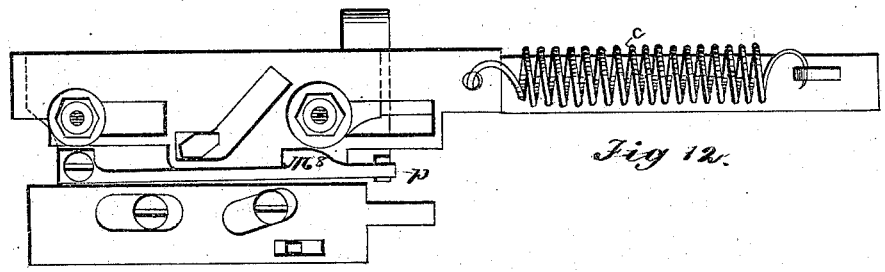

The lever P is held by the arm $P^2$ a greater or less length of time by making the arm which acts upon the pin of greater or less width, according as it is desired to hold the upper needles out of action while two or four courses are being knit by the frame or front needles. When the arm upon the shaft is disengaged from the pin upon the arm P, the latter is returned to place through the action of a proper spring, and the projection $p$ upon its upper end is consequently brought into position to disengage the spring-catch from the plate at the next forward movement of the frame, as shown in Fig. 12, and permit the latter, through the action of the spring $c$, to return to its proper position, by which means the needles are again thrown into operation.

The mechanism for operating the frame needles will now be described.

The frame carrying the cam mechanism, (shown in Fig. 8,) which operates the needles in a similar manner to that hereinbefore described, receives motion from the pivoted arm $H^1$, Figs. 2 and 7, attached to the frame operating the machine-needles.

As it is essential, from the construction and arrangement of the parts, that the machine-needles should move one-half the length of the cam in advance of the frame-needles when moving in both directions, the connection between the two frames is not a rigid one, but the arm plays in a suitable recess between two adjustable stops, $h^1\ h^1$, Fig. 7. The machine-needles move in advance of the frame-needles one-half of the length of the cam, because they operate to form the stitch just before they cease to be affected by the cam's movement, or at the end of the cam's movement, while the frame-needles are operated to form the stitch at the center of the movement caused by the cam. Notwithstanding that the machine-needles move in advance of the frame-needles, the latter operate to take up the stitch just in advance of the machine-needles, the stitch being formed in one case, as before stated, at the center point of the cam, and in the other case at the end of the cam.

When it is desired to make slack work, the frame and machine needles are simultaneously operated to draw in the loops to a greater extent than usual, this result being accomplished through the medium of the toothed wheel P' and pin c, before described, as far as it relates to the machine-needles. The motion from them is communicated, through the medium of the bar d, Fig. 7, to the plate $G^7$, having inclined slots, by which means the cam mechanism is lowered, and consequently the frame-needles are caused to draw in the loop to a greater distance.

When making slack work, also, it is essential that the frame and machine needles operate together instead of the frame-needles operating slightly in advance of the others, in order that both needles may take a sufficient quantity of the thread or yarn. To accomplish this, I provide the upper part of the lever $H^2$ with an adjustable screw, $h^2$, Figs. 2 and 7, which comes in contact, at the proper time, with one arm of the bent lever I, the other arm of which raises the arm H' and causes it to come in contact, in its movement, with the short stop $h^3$, so that the frame carrying the machine-needles is permitted to move in advance of the other enough quicker to bring its needles in operation at the same time. To retain the sliding plate $G^7$ in any desired position, the spring-catch $G^9$, Fig. 1, is provided.

For convenience in putting on the work, I make the vertical sley C, in which move the frame-needles, to slide in the frame-work, and I adjust it, when desired, by means of the cam-lever $G^{11}$, Figs. 1 and 2, which is provided with a stop, g, to limit its movement to any desired position.

It will be understood that, when the handle of the lever is moved to the right, the sley is permitted, by the cut-away portion of the lever, to descend by its own weight, and when the handle is moved to the left it is again raised.

The carriers for delivering the yarn or thread to the needles will now be described with their operating mechanism. A suitable frame-work is secured above the machine, which is adapted to hold one or more carrier-bars, $S^5$, and permit them to slide freely therein. $S^6$ represents an adjustable feeder, having a suitable hole at its lower end for the passage of the thread. Each bar is provided with suitable stops s for limiting its movement.

The mechanism for giving these bars their proper motion will now be described. $T^5$, Fig. 2, represents a stud projecting from one end of the carrier-bars, which is struck by a bolt, t, attached to the frame-work, adapted for operating the needles, which bolt has a double vertical movement at the end of the movement of the frame, by which means it is enabled to pass the stud of the carrier-bar when it has caused it to complete its movement and rise upon the other side for the purpose of carrying it back. This vertical movement of the bolt is obtained by means of a block, t', shown in dotted lines in Fig. 7, having a peculiar cam-groove, which actuates a pin attached to one side of the bolt, also shown in dotted lines, and gives it the proper rising and falling movement. The block itself is pivoted, and is actuated, near the end of the motion of the frame, in each direction by means of suitable stops upon the main sliding frame of the machine. But one carrier-bar is used at a time in the operation of the machine, but a number of them are usually provided, each carrying a different thread, in order to knit a top of various colors or patterns.

The mechanism for changing the carriers, so as to substitute a new thread for the one being used, will now be described. The cam-frame, supporting the sliding bars, is held in journals, as shown in Fig. 4, in such manner as to have a rocking motion. It is provided with an arm, $S^2$, to which is attached one end of a connecting-rod, $s^1$, the other end of which is attached to the horizontal bar $S^3$, as shown. $S^7$ represents a wheel attached to the shaft O', which wheel has upon its face pins of varying length, as shown in Fig. 1. These pins are adapted, as the wheel revolves, to come in contact with pieces $s^2$ of different lengths, rigidly fixed to the pivoted lever $S^4$. The horizontal bar $S^3$ is also provided, near its center, with a projection, $s^3$, shown in dotted lines, Fig. 4, which rests upon a block, $S^8$, having a recess of varying depth, as shown.

The operation is as follows; When the pattern-wheel revolves without any of the pins coming in contact with the projecting pieces $s^2$ upon bar $S^4$, the rear carrier-bar is adapted to give thread to the needles. When the long pin comes in contact with the longest projecting pin $s^2$ upon the bar $S^4$ the horizontal bar $S^3$ is moved forward enough to bring its projection $s^3$ upon the highest part of the block, by which means the carrier-frame is so revolved as to bring the front carrier into position to give thread to the needles. When the short pin is employed the middle carrier-bar is brought into operation. Of course, if desired, more carrier-bars may be used with an increased number of pins of varying length. In combination with each carrier-bar, I employ a take-up bar, U, which is adapted to take up the slack thread at the end of each movement in the following manner: As the carrier moves beyond the line of the needles in one direction, the thread, which would be necessarily slack in the return movement, is held by the take-up bar, which moves farther in each direction than the carrier-bar, and remains stationary until after the carrier-bar has commenced its return movement and used up the slack. This result is accomplished by the bar $P^{10}$, Fig. 1, pivoted to the carrier-bar and loosely connected to the take-up bar U, as shown, the lower end of which, at the close of the movement of the frame in each direction, comes in contact with a stop, $q$, upon the bracket $P^4$, by means of which the onward movement of the lower end is arrested, and its upper end caused to travel rapidly to move beyond the carrier-bar, as before described.

V, Figs. 1 and 2, represent the rollers upon which the work is wound. It is loose upon the shaft, but is connected to it, and receives motion from it by means of a spring clamping-bar, $V^1$, Figs. 1, 2, and 4, which presses upon the contracted portion of its periphery, as shown.

The machine constructed as described is capable, when in operation, of automatically making ribbed tops for socks, substantially as follows: A course is first knit with both sets of needles in operation. Two or four courses are then knit with the frame-needles only in operation, the machine-needles remaining inoperative. Both sets of needles are then operated together until the top portion proper is completed, when one course of slack-work is put in to adapt the top to be readily put upon the machine for knitting the remainder of the sock, after which a few courses of ordinary ribbed work are added to prevent the slack course from unraveling.

The machine, as described, is adapted for knitting tops of the ordinary length, but if extra length is desired I adapt the machine for making it by retarding the motion of the toothed wheel $P^1$, so that its pin $c$ does not so soon come in contact with the lever $H^2$, which operates the mechanism for causing the needles to make slack work. This is accomplished in the following manner: The toothed wheel $P^1$ is provided, at proper intervals upon its circumference, with two adjustable projecting teeth, $p^2$ $p^2$, Fig. 3, of large size, which are adapted, when the wheel revolves, to come into contact with one of the teeth of the wheel $P^{12}$, Fig. 9, attached to one of the sides of the disk $P^6$, and move it the distance of one tooth. This wheel is provided, upon the periphery of what may be termed its hub, with a cam-groove, shown at $x^4$, Fig. 3, in which rests a projecting pin attached to the hinged gate $P^{11}$, Figs. 9 and 10, of the disk. By the movement of the wheel, the gate is either opened or closed, as the case may be. When this gate is closed, it will be observed that the disk only moves the toothed wheel once at each revolution, instead of twice, by which means the slack mechanism is not operated until a greater length of top has been knit.

Instead of knitting the slack work at the end of the top to adapt it to be placed upon another machine, it is sometimes desirable to knit a pocket, as it is termed, to adapt the knit fabric to be secured to woven goods. This pocket consists of two independent strips of flat fabric of greater or less length, as may be desired. I adapt the machine for making this pocket in the following manner: The frame-needles are caused to operate in one movement of the frame, the machine-needles being inoperative, and the machine-needles on the return movement, the frame-needles being inoperative, in the following manner:

$G^6$, Fig. 8, represents a gate forming a portion of the cam-groove, which is attached to the spring-bar $G^4$, as shown. $G^3$ represents a bar which is adapted to slide beneath the end of spring-bar $G^4$, and withdraw the gate $G^6$, so that the bits of the needles in their movement in one direction are not raised by the cam-groove in the usual way, but are permitted to slide into the straight groove under the spring-bar $G^4$, and thus become inoperative.

This construction of parts it will be readily observed permits the frame-needles to operate only in one direction instead of both, as is usual.

The mechanism for throwing the top needles out of operation has already been described. This is so operated that the needles are thrown out of operation at the end of one movement, and thrown into operation at the end of the other.

Q represents a bar carrying guard-wires, which are adapted to prevent the latches of the needles from closing after the loop has been released.

Having thus fully described my invention, what I claim as new, and desire to secure by Letters Patent, is—

1. The combination of the cam-block L with the bar $L^3$, having an inclined slot, as described, the bar being adapted to adjust one side of the cam-block, substantially as and for the purpose described.

2. The combination of the cam-block N with the bar $M^7$, the latter being adapted to draw back the block for the purpose of making the needle inoperative, as described.

3. The combination, with the cam-block N, of the bar $M^7$, the spring-catch $M^8$, and the spring $c$, substantially as described.

4. The combination, with the cam-block N, of the bar $M^7$, spring-catch $M^8$, spring $c$, the lever P, and the shaft $O'$ having the arm $P^2$, substantially as described.

5. The combination of the bar $L^3$, constructed as described, with the lever $L^4$, rod $d$ $d'$, and lever $H^2$.

6. The combination of the toothed wheel $P^1$ having pin $c$, the lever $H^2$, bar $d$, lever $L^4$, and bar $L^3$, substantially as described.

7. The combination of the toothed wheel $P^1$ having pin $c$, and lever $H^2$ having adjustable stop $h^2$, with the bent lever I, arm $H^1$, and the sliding frames carrying the cam mechanism for the machine and frame needles, as described.

8. The combination of the pivoted arm $H^1$ with the adjustable stops $h^1$ $h^1$ $h^3$, substantially as described.

9. The cam-plate G and cam G¹, in combination with bar G³ and the bar G⁴, carrying the gate G⁶, as described.

10. The combination of machine and frame needles and their operating cams with the automatic connecting mechanism, substantially as described, whereby they are adapted to knit ribbed work, close and slack, substantially as described.

11. The combination of the machine and frame needles and their operating cams with the adjusting mechanism, substantially as described, for adapting the machine to knit a ribbed top of greater or less length, substantially as set forth.

12. The pattern-wheel having adjustable pins, in combination with the pivoted bar S⁴, having the projecting pieces of varying length and the swinging carrier-frame, substantially as described.

13. The recessed block S⁸, in combination with the pivoted bar S³ and the swinging carrier-frame, as described.

THOMAS COLTMAN.

Witnesses:
HENRY WILLIAM GOUGH,
JOSIAH GIMSON.